(12) United States Patent
Markey et al.

(10) Patent No.: US 12,358,366 B2
(45) Date of Patent: Jul. 15, 2025

(54) TRANSMISSION WITH POWER TAKE-OFF

(71) Applicant: Dana Belgium N.V., Flanders (BE)

(72) Inventors: Jan Markey, Wingene (BE); Filip D. Schacht, Meulebeke (BE); Kurt Cattoor, Koolkerke (BE); Bert Hannon, Bruges (BE)

(73) Assignee: DANA BELGIUM N.V., Bruges (BE)

( * ) Notice: Subject to any disclaimer, the term of this patent is extended or adjusted under 35 U.S.C. 154(b) by 0 days.

(21) Appl. No.: 18/501,894

(22) Filed: Nov. 3, 2023

(65) Prior Publication Data
US 2025/0144999 A1 May 8, 2025

(51) Int. Cl.
*B60K 17/28* (2006.01)
*B60K 1/00* (2006.01)

(52) U.S. Cl.
CPC ............. *B60K 17/28* (2013.01); *B60K 1/00* (2013.01)

(58) Field of Classification Search
CPC ......... B60K 17/28; B60K 25/06; F16D 11/04; F16D 11/10; F16D 11/16; F16D 25/00–14; F16H 2200/0004; F16H 2200/2064; F16H 2200/2094; F16H 2200/0034–0073
See application file for complete search history.

(56) References Cited

U.S. PATENT DOCUMENTS

| | | | |
|---|---|---|---|
| 6,450,051 B1* | 9/2002 | Balamuki | F16H 63/3023 74/335 |
| 11,235,662 B1* | 2/2022 | Shidore | B60K 17/02 |
| 11,247,563 B2 | 2/2022 | Van Dingenen et al. | |
| 11,655,863 B1 | 5/2023 | Versini et al. | |
| 2009/0272212 A1* | 11/2009 | Raszkowski | F16H 57/0037 74/331 |
| 2017/0043661 A1* | 2/2017 | Reinhart | F16H 57/0435 |
| 2019/0140474 A1* | 5/2019 | Stoltz | B60K 25/06 |
| 2021/0354556 A1* | 11/2021 | Czernobil | F16H 37/043 |
| 2022/0032755 A1* | 2/2022 | Seemann | B60K 17/16 |
| 2022/0170534 A1* | 6/2022 | Hannon | B60K 17/08 |
| 2022/0185105 A1* | 6/2022 | Schacht | B60K 17/08 |
| 2023/0167888 A1 | 6/2023 | Li et al. | |

FOREIGN PATENT DOCUMENTS

DE     102020101667 A1    7/2021

* cited by examiner

*Primary Examiner* — Ernesto A Suarez
*Assistant Examiner* — Lillian T Nguyen
(74) *Attorney, Agent, or Firm* — McCoy Russell LLP

(57) ABSTRACT

Methods and systems for providing power to a mechanical system of an electric vehicle are described. The methods and systems may be applied to vehicles that include hydraulically operated systems and that are propelled via an electric machine. The methods and systems may allow a single electric machine to propel a vehicle and drive an external load when the vehicle is not being propelled.

14 Claims, 6 Drawing Sheets

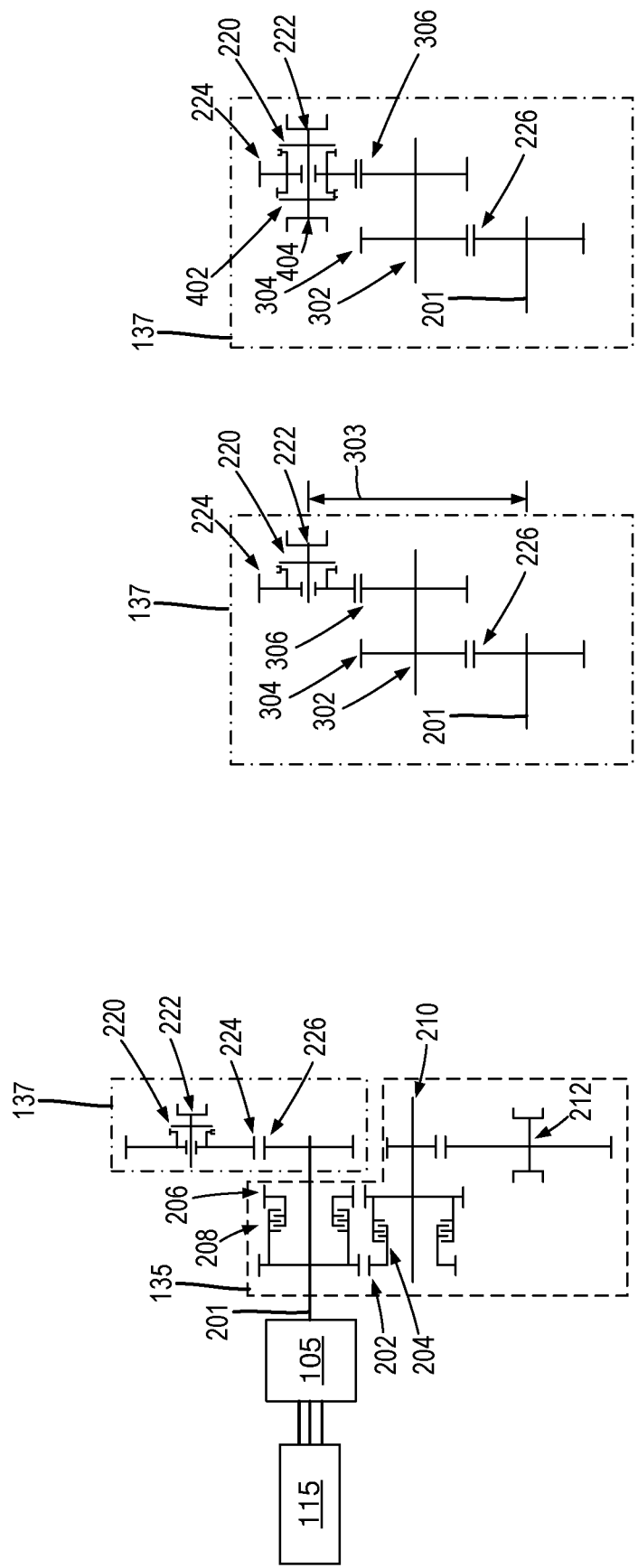

TRANSMISSION WITH POWER TAKE-OFF

TECHNICAL FIELD

The present disclosure relates to a transmission with a power take-off. The transmission may be included in an electrically propelled vehicle.

BACKGROUND AND SUMMARY

Electric vehicles are expanding beyond being transportation sources for individuals. For example, electric vehicles are making inroads into commercial vehicles that are used to perform work. The work may include supplying mechanical energy to drive hydraulic pumps and other mechanical loads such as mixers. The electric vehicles may provide power to non-propulsion loads via one or more dedicated electric machines. However, the electric machines that rotate and power the non-propulsion loads may also employ inverters and/or other power conversion devices that increase the financial expense of the vehicles. Further, the mechanical systems that are driven by electric machines vary in configuration and power consumption so a single electric drive system may be impractical.

The inventors herein have recognized the above-mentioned issues and have developed a two-speed transmission, comprising: a transmission case; an input shaft; an intermediate shaft; an output shaft; a power take-off that is configured to bolt on to the transmission case and couple to the input shaft via a gear; and an actual total number of two gear ratios, the two gear ratios configured to couple the input shaft to the output shaft.

By providing a power take-off that bolts to a case of a transmission, it may be possible to provide power to an array of different types of devices with a single transmission. Further, the transmission may allow a single electric machine to power many different types of mechanical loads as well as propelling a vehicle. Further still, the electric machine may be operated in a torque control mode (e.g., where torque of the electric machine follows a requested or target torque while electric machine speed is permitted to vary) when propelling a vehicle and in a speed control mode (e.g., where speed of the electric machine follows a requested or target speed and torque output of the electric machine is permitted to vary) when the electric machine is driving an external mechanical load (e.g., a mechanical load other than propelling the vehicle).

The present description may provide several advantages. In particular, the approach may allow a plurality of different mechanically driven devices with different configurations to be driven via a single transmission. Further, the approach allows for different power take-off designs to be coupled to a single transmission. In addition, the approach may include a controller to operate the transmission in different operating modes. Additionally, the vehicle may be equipped with a single electric machine and inverter for driving external mechanical loads so that the vehicle's electric configuration may be simplified.

It is to be understood that the summary above is provided to introduce in simplified form a selection of concepts that are further described in the detailed description. It is not meant to identify key features of the claimed subject matter, the scope of which is defined uniquely by the claims that follow the detailed description. Furthermore, the claimed subject matter is not restricted to implementations that solve any disadvantages noted above or in any part of this disclosure.

BRIEF DESCRIPTION OF THE DRAWINGS

FIGS. 2-5 show different example power take-off configurations.

DETAILED DESCRIPTION

Figure 1:
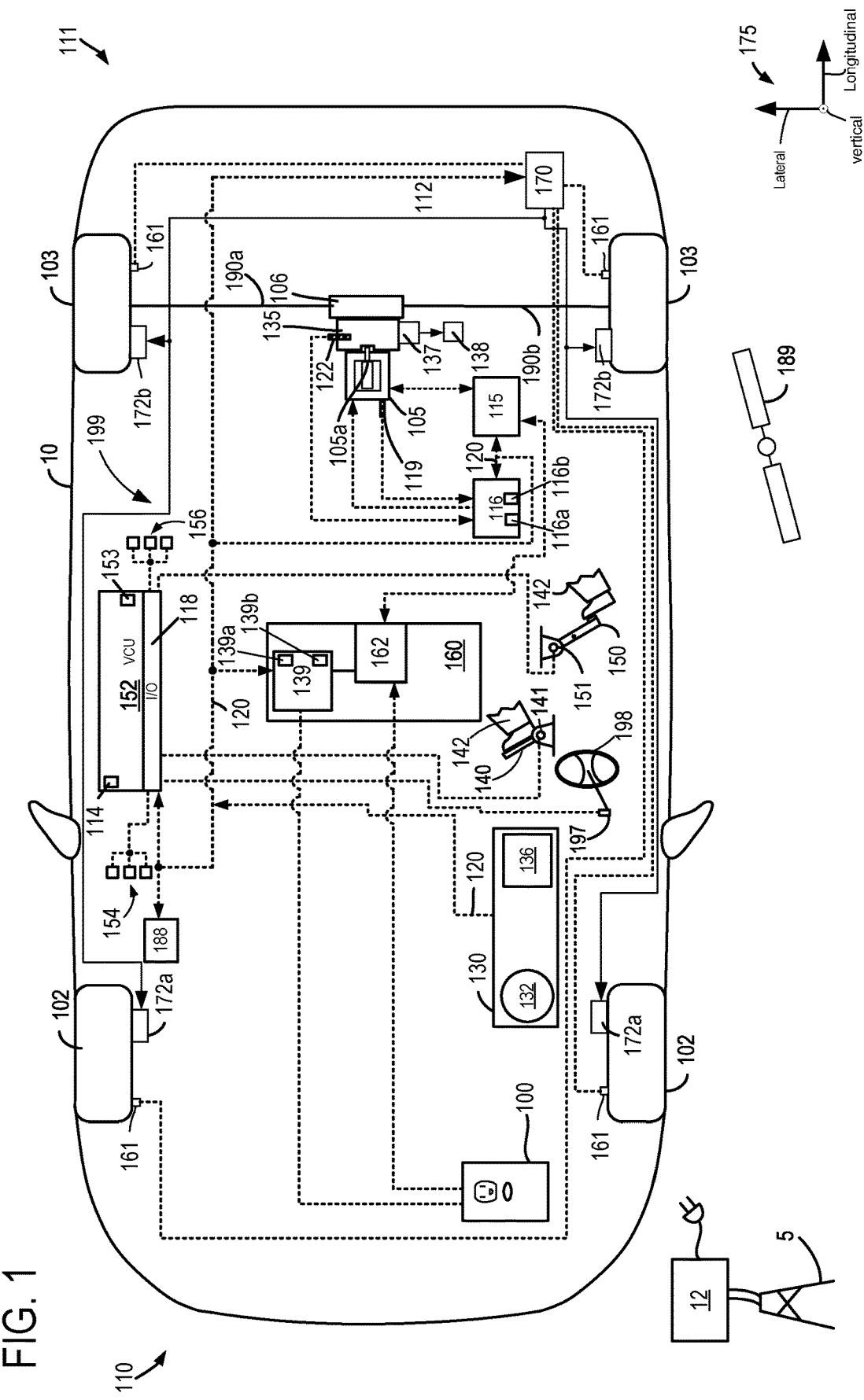
FIG. 1 is an illustration of an example vehicle that includes an electric machine and a transmission that is configured to propel a vehicle.
Figure 7:
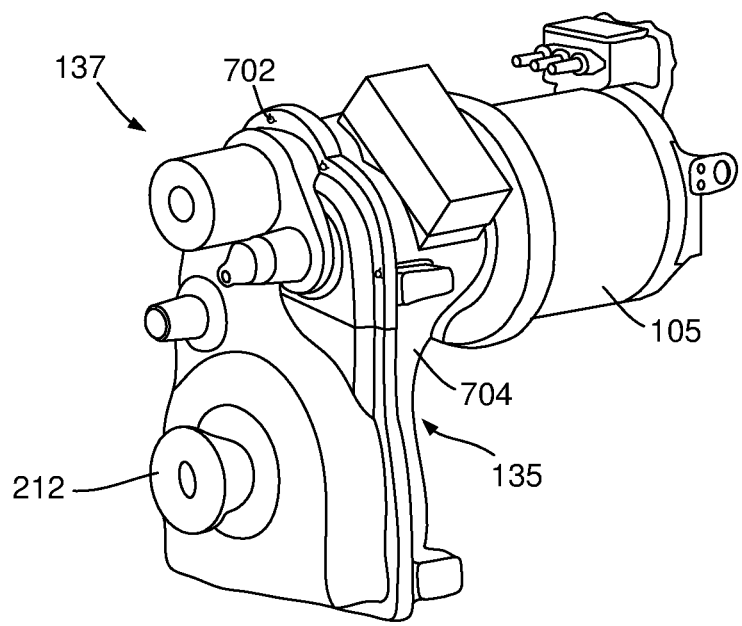
FIGS. 7-9 show example views of a power take-off.
Figure 8:
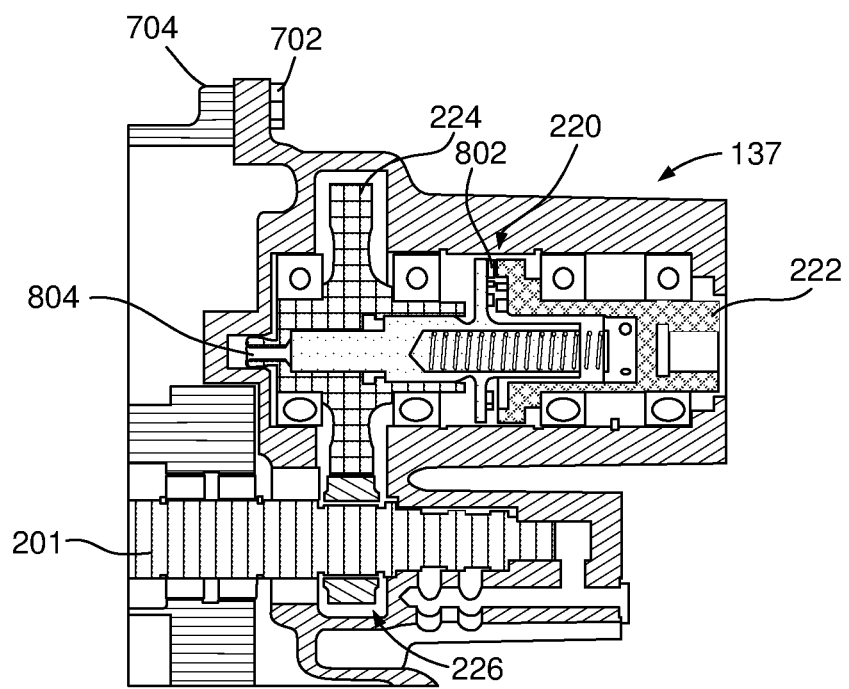
Figure 9:
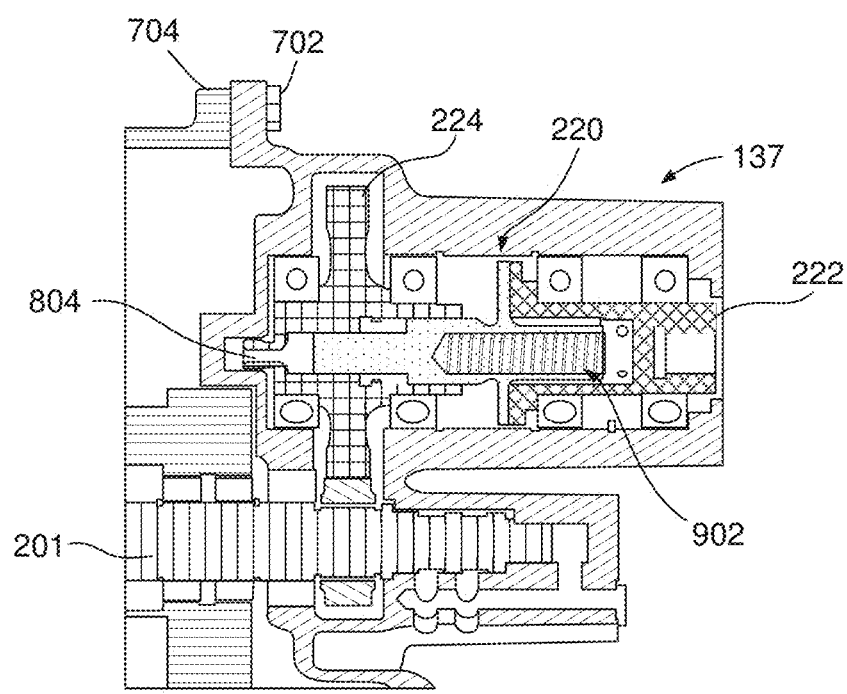

A method and system for providing a power take-off for an electric vehicle are described. In one example, the power take-off is a bolt on device that is suitable for being coupled to a transmission. The transmission may be electrically driven. The transmission may be operated in a drive mode and a work mode. The work mode allows the power take-off to drive an external load via the electric machine. An electric vehicle that includes a power take-off is shown in FIG. 1. The power take-off may be configured as shown in FIGS. 2-5. The transmission may be operated according to the method of FIG. 6. The power take-off may be configured as shown in FIGS. 7-9.

FIG. 1 illustrates an example vehicle propulsion system 199 for vehicle 10. A front end 110 of vehicle 10 is indicated and a rear end 111 of vehicle 10 is also indicated. Vehicle 10 travels in a forward direction when front end 110 leads movement of vehicle 10. Vehicle 10 travels in a reverse direction when rear end 111 leads movement of vehicle 10. Vehicle propulsion system 199 includes a propulsion source 105 (e.g., an electric machine, such as a motor), but in other examples two or more propulsion sources may be provided. In one example, propulsion source 105 may be a synchronous or induction electric machine that may operate as a motor or generator. The propulsion source 105 is fastened to the transmission 190 and it delivers power from its rotor 105*a* to gear set 107. In FIG. 1 mechanical connections between the various components are illustrated as solid lines, whereas electrical connections between various components are illustrated as dashed lines.

Vehicle propulsion system 199 includes a transmission 135. Transmission 135 may be mechanically coupled to differential gears 106. Differential gears may be coupled to two axle shafts, including a first or right axle shaft 190*a* and a second or left axle shaft 190*b*. Vehicle 10 further includes front wheels 102 and rear wheels 103.

The transmission 135 may be referred to as a step ratio transmission and it may be configured as shown in greater detail in FIG. 2. In this example, power take-off is shown bolted to a case of transmission 135. Power take-off may selectively deliver rotational energy to external mechanical load 138 (e.g., a hydraulic pump or mixer). Further, the transmission 135 may include one or more clutch actuators 112 to shift one or more clutches. Transmission 135 may include a first speed sensor 119 for sensing a speed of propulsion source 105 and a second speed sensor 122 for sensing a transmission output shaft speed. Electric power inverter 115 is electrically coupled to propulsion source 105. Powertrain control unit 116 is electrically coupled to sensors and actuators of transmission 135.

Propulsion source 105 may transfer mechanical power to or receive mechanical power from transmission 135. As such, transmission 135 may be a multi-speed gear set that may shift between gears when commanded via powertrain control unit 116. Powertrain axle control unit 116 includes a processor 116a and memory 116b. Memory 116b may include read exclusive memory, random access memory, and keep alive memory. Transmission 135 may transfer mechanical power to or receive mechanical power from differential gears 106. Differential gears 106 may transfer mechanical power to or receive mechanical power from rear wheels 103 via right axle shaft 190a and left axle shaft 190b. Propulsion source 105 may consume alternating current (AC) electrical power provided via electric power inverter 115. Alternatively, propulsion source 105 may provide AC electrical power to electric power inverter 115. Electric power inverter 115 may be provided with high voltage direct current (DC) power from battery 160 (e.g., a traction battery, which also may be referred to as an electric energy storage device or battery pack). Electric power inverter 115 may convert the DC electrical power from battery 160 into AC electrical power for propulsion source 105. Alternatively, electric power inverter 115 may be provided with AC power from propulsion source 105. Electric power inverter 115 may convert the AC electrical power from propulsion source 105 into DC power to store in battery 160.

Battery 160 may periodically receive electrical energy from a power source such as a stationary power grid 5 residing external to the vehicle (e.g., not part of the vehicle). As a non-restricted example, vehicle propulsion system 199 may be configured as a plug-in electric vehicle (EV), whereby electrical energy may be supplied to battery 160 via the power grid 5 and charging station 12. Electric charge may be delivered to battery 160 via plug receptacle 100.

Battery 160 may include a BMS controller 139 (e.g., a battery management system controller) and an electrical power distribution box 162. BMS controller 139 may provide charge balancing between energy storage elements (e.g., battery cells) and communication with other vehicle controllers (e.g., vehicle control unit 152). BMS controller 139 includes a core processor 139a and memory 139b (e.g., random-access memory, read-exclusive memory, and keep-alive memory).

Vehicle 10 may include a vehicle control unit (VCU) 152 that may communicate with electric power inverter 115, powertrain control unit 116, friction or foundation brake controller 170, global positioning system (GPS) 188, BMS controller 139, and dashboard 130 and components included therein via controller area network (CAN) 120. VCU 152 includes memory 114, which may include read-exclusive memory (ROM or non-transitory memory) and random access memory (RAM). VCU also includes a digital processor or central processing unit (CPU) 153, and inputs and outputs (I/O) 118 (e.g., digital inputs including counters, timers, and discrete inputs, digital outputs, analog inputs, and analog outputs). VCU may receive signals from sensors 154 and provide control signal outputs to actuators 156. Sensors 154 may include but are not restricted to lateral accelerometers, longitudinal accelerometers, yaw rate sensors, inclinometers, temperature sensors, battery voltage and current sensors, and other sensors described herein. Additionally, sensors 154 may include steering angle sensor 197, driver demand pedal position sensor 141, vehicle range finding sensors including radio detection and ranging (RADAR), light detection and ranging (LIDAR), sound navigation and ranging (SONAR), and brake pedal position sensor 151. Actuators may include but are not constrained to inverters, transmission controllers, display devices, human/machine interfaces, friction braking systems, and battery controller described herein.

Driver demand pedal position sensor 141 is shown coupled to driver demand pedal 140 for determining a degree of application of driver demand pedal 140 by human 142. Brake pedal position sensor 151 is shown coupled to brake pedal 150 for determining a degree of application of brake pedal 150 by human 142. Steering angle sensor 197 is configured to determine a steering angle according to a position of steering wheel 198.

Vehicle propulsion system 199 is shown with a global position determining system 188 that receives timing and position data from one or more GPS satellites 189. Global positioning system may also include geographical maps in ROM for determining the position of vehicle 10 and features of roads that vehicle 10 may travel on.

Vehicle propulsion system 199 may also include a dashboard 130 that an operator of the vehicle may interact with. Dashboard 130 may include a display system 132 configured to display information to the vehicle operator. Display system 132 may comprise, as a non-restricting example, a touchscreen, or human machine interface (HMI), display which enables the vehicle operator to view graphical information as well as input commands. In some examples, display system 132 may be connected wirelessly to the internet (not shown) via VCU 152. As such, in some examples, the vehicle operator may communicate via display system 132 with an internet site or software application (app) and VCU 152.

Dashboard 130 may further include an operator interface 136 via which the vehicle operator may adjust the operating status of the vehicle. Specifically, the operator interface 136 may be configured to activate and/or deactivate operation of the vehicle driveline (e.g., propulsion source 105) based on an operator input. Further, an operator may request an axle mode (e.g., park, reverse, neutral, drive) via the operator interface. Various examples of the operator interface 136 may include interfaces that utilize a physical apparatus, such as a key, that may be inserted into the operator interface 136 to activate the vehicle propulsion system 199 including propulsion source 105 and to turn on the vehicle 10. The apparatus may be removed to shut down the transmission 135 and propulsion source 105 to turn off vehicle 10. Propulsion source 105 may be activated via supplying electric power to propulsion source 105 and/or electric power inverter 115. Propulsion source 105 may be deactivated by ceasing to supply electric power to propulsion source 105 and/or electric power inverter 115. Still other examples may additionally or optionally use a start/stop button that is manually pressed by the operator to start or shut down the propulsion source 105 to turn the vehicle on or off. In other examples, a remote electrified axle or electric machine start may be initiated remote computing device (not shown), for example a cellular telephone, or smartphone-based system where a user's cellular telephone sends data to a server and the server communicates with the vehicle control unit 152 to activate the inverter 115 and propulsion source 105. Spatial orientation of vehicle 10 is indicated via axes 175.

Vehicle 10 is also shown with a foundation or friction brake controller 170. Friction brake controller 170 may selectively apply and release friction brakes (e.g., 172a and 172b) via allowing hydraulic fluid to flow to the friction brakes. The friction brakes may be applied and released so as to avoid locking of the friction brakes to front wheels 102 and rear wheels 103. Wheel position or speed sensors 161 may provide wheel speed data to friction brake controller 170. Vehicle propulsion system 199 may provide torque to rear wheels 103 to propel vehicle 10.

A human or autonomous driver may request a driver demand wheel torque, or alternatively a driver demand wheel power, via applying driver demand pedal 140 or via supplying a driver demand wheel torque/power request to vehicle control unit 152. Vehicle control unit 152 may then demand a torque or power from propulsion source 105 via commanding powertrain control unit 116. Powertrain control unit 116 may command electric power inverter 115 to deliver the driver demand wheel torque/power via electrified axle 190 and propulsion source 105. Electric power inverter 115 may convert DC electrical power from battery 160 into AC power and supply the AC power to propulsion source 105. Propulsion source 105 rotates and transfers torque/power to gear set 107. Gear set 107 may supply torque from propulsion source 105 to differential gears 106, and differential gears 106 transfer torque from propulsion source 105 to rear wheels 103 via axle shafts 190*a* and 190*b*.

During conditions when the driver demand pedal is fully released, vehicle control unit 152 may request a small negative or regenerative braking power to gradually slow vehicle 10 when a speed of vehicle 10 is greater than a threshold speed. The amount of regenerative braking power requested may be a function of driver demand pedal position, battery state of charge (SOC), vehicle speed, and other conditions. If the driver demand pedal 140 is fully released and vehicle speed is less than a threshold speed, vehicle control unit 152 may request a small amount of positive torque/power (e.g., propulsion torque) from propulsion source 105, which may be referred to as creep torque or power. The creep torque or power may allow vehicle 10 to remain stationary when vehicle 10 is on a small positive grade.

The human or autonomous driver may also request a negative or regenerative driver demand braking torque, or alternatively a driver demand braking power, via applying brake pedal 150 or via supplying a driver demand braking power request to vehicle control unit 152. Vehicle control unit 152 may request that a first portion of the driver demanded braking power be generated via propulsion source 105 via commanding powertrain control unit 116. Additionally, vehicle control unit 152 may request that a portion of the driver demanded braking power be provided via friction brakes 172 via commanding friction brake controller 170 to provide a second portion of the driver requested braking power.

After vehicle control unit 152 determines the braking power request, vehicle control unit 152 may command powertrain control unit 116 to deliver the portion of the driver demand braking power allocated to propulsion source 105. Electric power inverter 115 may convert AC electrical power generated by propulsion source 105 into DC power for storage in battery 160. Propulsion source 105 may convert the vehicle's kinetic energy into AC power.

Powertrain control unit 116 includes predetermined transmission gear shift schedules whereby fixed ratio gears of transmission 135 may be selectively engaged and disengaged. Shift schedules stored in powertrain control unit 116 may select gear shift points or conditions as a function of driver demand wheel torque and vehicle speed.

Turning now to FIG. 2, a schematic diagram of transmission 135 and power take-off 137 is shown. In this example, transmission 135 is shown as a two-speed transmissions that includes an input shaft 201, an intermediate shaft 210, and an output shaft 212. First gear 202 and a second gear 206 may selectively couple input shaft 201 to output shaft 212. First gear 202 may be selectively engaged via closing first gear clutch 204. Similarly, second gear 206 may be selectively engaged via closing second gear clutch 208. Input shaft 201 is show coupled to propulsion source 105 and inverter 115 may supply electric power to propulsion source 105.

Power take-off 137 may be bolted to a case of transmission 135. In this example, power take-off device is configured with a power take-off drive gear 224, a power take-off clutch 220, and a power take-off output shaft 222. Power take-off drive gear 224 may be driven via input shaft gear 226. Since power take-off 137 may be bolted to the case of transmission 135, power take-off may be configured in a plurality of different configurations as shown in FIGS. 3-6.

Referring now to FIG. 3, a first alternative example of power take-off 137 is shown. In this example, power take-off 137 includes a power take-off intermediate shaft 302 that may be applied to increase an offset distance as indicated by arrow 303. The offset distance is a distance between transmission input shaft 201 and power take-off output shaft 222. In this example, input shaft gear 226 may rotate intermediate shaft gear 304, thereby rotating power take-off intermediate shaft 302. Power take-off output shaft 222 may rotate when power take-off clutch 220 is engaged and gear 306 rotates power take-off drive gear 224. The distance indicated by arrow 303 may be increased or decreased via adjusting diameters of gear 306 and power take-off gear 224.

Referring now to FIG. 4, a second alternative example of power take-off 137 is shown. In this example, power take-off 137 includes a power take-off intermediate shaft 302 that may be applied to increase an offset distance as indicated by arrow 303. Power take-off also includes clutch 220 and a second clutch 402 for two output shafts 222 and 404 that may be applied to driving two different loads.

Figure 5:
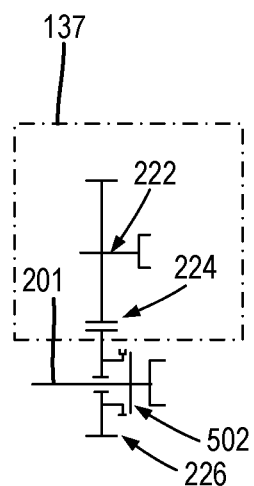

Referring now to FIG. 5, a third alternative example of power take-off 137 is shown. In this example, power take-off 137 does not include a clutch. Rather, power take-off clutch 502 is included in transmission 135 where it may selectively couples input shaft 201 to gear 226. This configuration has the advantage of not having to supply hydraulic fluid outside of transmission 135. In this example, power take-off clutch 502 may be directly coupled to (e.g., in physical contact with) gear 226. The power take-off clutches shown in FIGS. 2-5 may be hydraulically actuated clutches.

Figure 6:
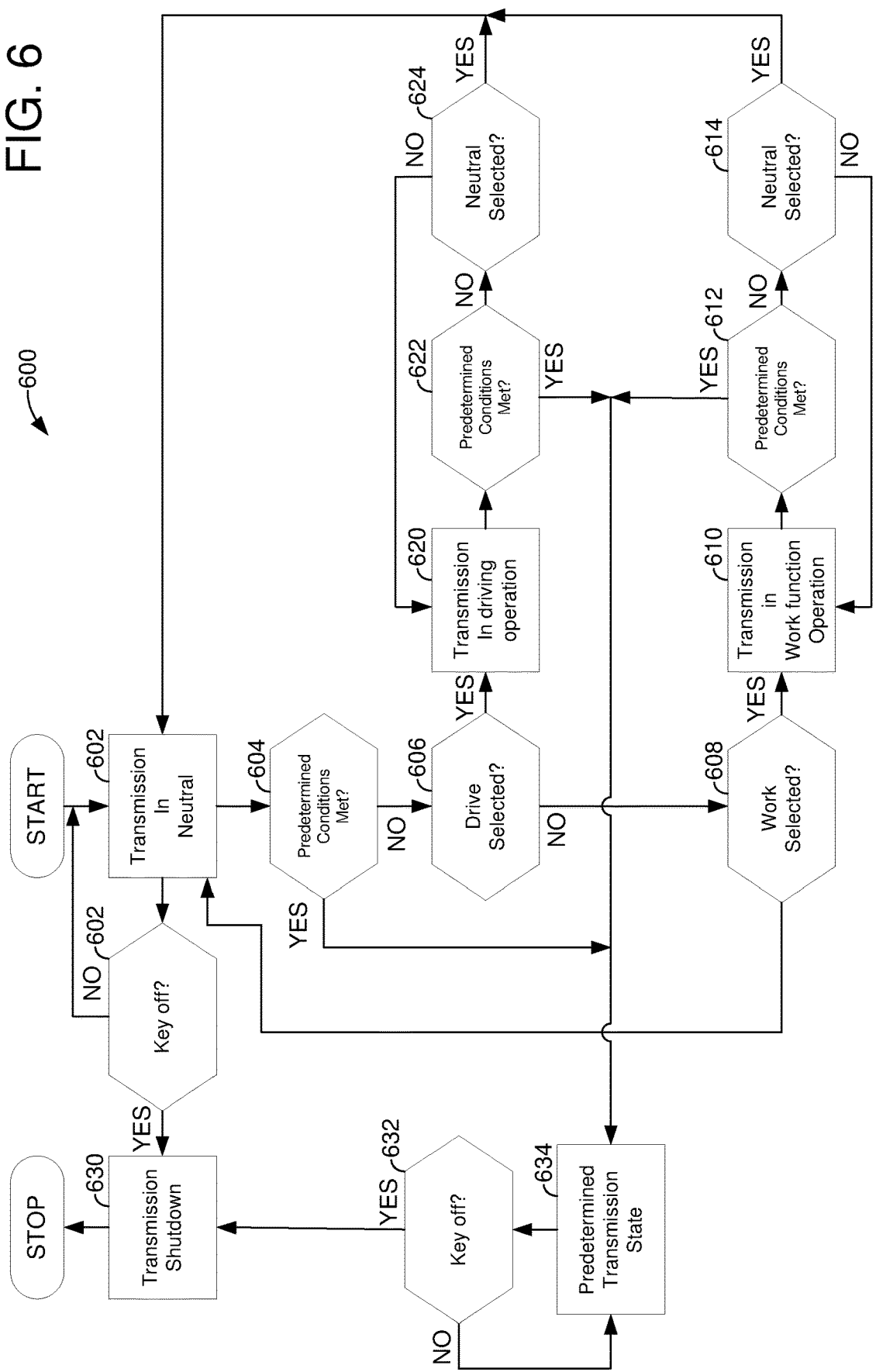
FIG. 6 shows example method for operating a transmission with power take-off.

Referring now to FIG. 6, a flow chart of a method for operating vehicle that includes a transmission with power take-off is shown. The method of FIG. 6 may be applied in cooperation with the system of FIGS. 1-5. One or more controllers may perform at least a portion of method 600 via changing operating states of one or more actuators in the real world. The method 600 may be at least partially implemented as executable instructions stored in non-transitory memory of a controller in a system such as that shown in FIGS. 1-5.

At 602, the transmission is in neutral (e.g., first gear clutch and second gear clutch are open). The electric machine may be activated and it may or may not be rotating. Method 600 proceeds to 604.

At 604, method 600 judges whether or not predetermined conditions are met. In one example, the predetermined conditions may include where transmission sensors or actuator are degraded or conditions where the transmission may be degraded. If method 600 judges that predetermined conditions are present, the answer is yes and method 600 proceeds to 634. Otherwise, the answer is no and method 600 proceeds to 606.

At 606, method 600 judges whether or not drive for the transmission has been selected. The drive mode may be selected via a human/machine interface. If method 600 judges that drive has been selected, the answer is yes and method 600 proceeds to 620. Otherwise, the answer is no and method 600 proceeds to 608.

At 620, method 600 engages the transmission in drive and the transmissions gears may be selected according to vehicle speed and driver demand. Method 600 may operate the electric machine in a torque control mode to propel a vehicle where electric machine output provides a driver demand wheel torque or a driver demand electric machine torque that may be based on driver demand pedal position. Method 600 may also prevent the power take-off clutch from being engaged when the vehicle is in drive or reverse mode. Method 600 proceeds to 622.

At 622, method 600 judges whether or not predetermined conditions are met. In one example, the predetermined conditions may include where transmission sensors or actuator are degraded or conditions where the transmission may be degraded. If method 600 judges that predetermined conditions are present, the answer is yes and method 600 proceeds to 634. Otherwise, the answer is no and method 600 proceeds to 624.

At 624, method 600 judges whether or not neutral for the transmission has been selected. The neutral mode may be selected via a human/machine interface. If method 600 judges that neutral has been selected, the answer is yes and method 600 returns to 602. Otherwise, the answer is no and method 600 returns to 620.

At 608, method 600 judges whether or not work mode for the transmission has been selected. The work mode may be selected via a human/machine interface. If method 600 judges that work has been selected, the answer is yes and method 600 proceeds to 610. Otherwise, the answer is no and method 600 returns to 602.

At 610, method 600 engages the transmission in work mode where the power take-off may be activated. The user may select the power take-off output shaft speed and the transmission's first gear and second gear clutches may be prevented from engaging so that the vehicle remains stationary in work mode. Instead of operating the electric machine in torque control mode, the electric machine may be operated in speed control mode to generate the requested power take-off speed. Method 600 proceeds to 612.

At 612, method 600 judges whether or not predetermined conditions are met. In one example, the predetermined conditions may include where transmission sensors or actuator are degraded or conditions where the transmission may be degraded. If method 600 judges that predetermined conditions are present, the answer is yes and method 600 proceeds to 634. Otherwise, the answer is no and method 600 proceeds to 614.

At 614, method 600 judges whether or not neutral for the transmission has been selected. The neutral mode may be selected via a human/machine interface. If method 600 judges that neutral has been selected, the answer is yes and method 600 returns to 602. Otherwise, the answer is no and method 600 returns to 610.

At 602, method 600 may judge whether or not a key-off or vehicle shutdown has been requested. A vehicle shutdown may be requested via a human/machine interface or via a remote device. If method 600 judges that key-off or vehicle shutdown has been requested, the answer is yes and method 600 proceeds to 630. Otherwise, the answer is no and method 600 returns to 602.

At 634, method 600 may command transmission actuators and the electric machine to predetermined operating states. The predetermined operating states may allow for limited operation of the transmission, electric machine, and power take-off. For example, the power take-off may not be engaged. Further, torque output of the electric machine may be constrained to less than a threshold amount of torque and the transmission may engage solely one of its two forward gears. Thus, the transmission and electric machine may be commanded to predetermined states and the predetermined states may be a function of transmission configuration and the predetermined conditions that have been met. Method 600 proceeds to 632.

At 632, method 600 may judge whether or not a key-off or vehicle shutdown has been requested. A vehicle shutdown may be requested via a human/machine interface or via a remote device. If method 600 judges that key-off or vehicle shutdown has been requested, the answer is yes and method 600 proceeds to 630. Otherwise, the answer is no and method 600 returns to 634.

At 630, method 600 proceeds to shut the transmission down. Shutting the transmission down may include ceasing to supply electric power to the electric machine and engaging the transmission in a predetermined state (e.g., neutral or park). Method 600 proceeds to exit.

In this way, a transmission of an electric vehicle may be operated. The operation may include preventing engagement of a power take-off when the vehicle is in a drive or reverse mode. If the vehicle is in a work mode where the power take-off is activated, the vehicle may not exit neutral or park.

Thus, the method of FIG. 6 provides for a method for operating a vehicle, comprising:

propelling the vehicle via an electric machine coupled to a two-speed transmission that includes a power take-off bolted to a case of the two-speed transmission; and driving a mechanical load via the power take-off and the electric machine when the vehicle is not being propelled via the electric machine. In a first example, the method further comprises operating the electric machine in a speed control mode via a controller while driving the mechanical load. In a second example that may include the first example, the method includes where the power take-off includes a hydraulically actuated clutch that is configured to selectively engage a power take-off shaft. In a third example that may include one or both of the first and second examples, the method further comprises preventing engagement of the hydraulically actuated clutch in response to the vehicle being propelled via the electric machine. In a fourth example that may include one or more of the first through third examples, the method further comprises preventing the vehicle from being propelled via the electric machine in response to the hydraulically actuated clutch is engaged. In a fifth example that may include one or more of the first through fourth examples, the method includes wherein an input shaft of the two-speed transmission includes a gear to drive the power take-off. In a sixth example that may include one or more of the first through fifth examples, the method further comprises supplying oil to the power take-off via the case of the two-speed transmission.

Referring now to FIG. 7, a perspective view of transmission 135 is shown. In this view, the power take-off 137 is shown bolted onto case 704 of transmission 135. Bolts 702 fasten power take-off 137 to case 704. Transmission output shaft 212 and electric machine 105 are also shown.

Referring now to FIG. 8, a cut-away of power take-off 137 is shown. In this figure, power take-off clutch 220 is shown in an open position. Power take-off 137 is shown bolted to case 704. Input shaft gear 226 is shown coupled to input shaft 201. Power take-off drive gear 224 is shown meshing with input shaft gear 226. Teeth 802 of power take-off clutch 220 are shown indicating that power take-off clutch 220 is a dog clutch. Oil or hydraulic fluid may flow into orifice 804 to actuate power take-off clutch 220. Oil or hydraulic fluid may flow through case 704 or input shaft 201 to orifice 804. Power take-off clutch 220 selectively engages power take-off output shaft 222 to power take-off drive gear 224 and input shaft 201.

Referring now to FIG. 9, a cut-away of power take-off 137 is shown. In this figure, power take-off clutch 220 is shown in a closed position. In the closed position, teeth on both sides of the power take-off clutch are engaged. Oil or hydraulic fluid pressure causes spring 902 to compress, thereby allowing clutch teeth (not shown) to engage.

Thus, the system of FIGS. 1-5 and 7-9 provides for a two-speed transmission, comprising: a transmission case; an input shaft; an intermediate shaft; an output shaft; a power take-off that is configured to bolt on to the transmission case and couple to the input shaft via a gear; and an actual total number of two gear ratios, the two gear ratios configured to couple the input shaft to the output shaft. In a first example, the two-speed transmission further comprises a clutch included with the power take-off and configured to selectively engage the power take-off. In a second example that may include the first example, the two-speed transmission includes where the clutch is hydraulically actuated. In a third example that may include one or both of the first and second examples, the two-speed transmission includes wherein the power take-off includes a power take-off shaft. In a fourth example that may include one or more of the first through third examples, the two-speed transmission includes wherein the clutch is directly coupled to a gear fixed to input shaft. In a fifth example that may include one or more of the first through fourth examples, the two-speed transmission includes wherein the clutch is directly coupled to a gear fixed to the power take-off shaft. In a sixth example that may include one or more of the first through fifth examples, the two-speed transmission includes wherein the power take-off shaft is configured to drive two different loads. In a seventh example that may include one or more of the first through sixth examples, the two-speed transmission includes wherein the clutch is a dog clutch.

The system of FIGS. 1-5 and 7-9 also provides for a transmission, comprising: an electric machine configured to propel a vehicle; a transmission case; an input shaft coupled to the electric machine; an intermediate shaft; an output shaft; a power take-off that is configured to bolt on to the transmission case and couple to the input shaft via a gear, the power take-off including a hydraulically actuated dog clutch. In a first example, the transmission further comprises a controller configured to operate the electric machine in a torque control mode while the electric machine is propelling the vehicle, the controller also configured to operate the electric machine in a speed control mode while the electric machine is driving a load via the power take-off. In a second example that may include the first example, the transmission includes wherein the electric machine is mechanically coupled to the input shaft and an inverter. In a third example that may include one or both of the first and second examples, the transmission includes where the transmission includes an actual total number of two gear ratios to propel the vehicle. In a fourth example that may include one or more of the first through third examples, the transmission includes wherein the hydraulically actuated dog clutch is supplied with oil that passes through the transmission case.

Note that the example control and estimation routines included herein can be used with various powertrain and/or vehicle system configurations. The control methods and routines disclosed herein may be stored as executable instructions in non-transitory memory and may be carried out by the control system including the controller in combination with the various sensors, actuators, and other transmission and/or vehicle hardware. Further, portions of the methods may be physical actions taken in the real world to change a state of a device. Thus, the described actions, operations and/or functions may graphically represent code to be programmed into non-transitory memory of the computer readable storage medium in the vehicle and/or transmission control system. The specific routines described herein may represent one or more of any number of processing strategies such as event-driven, interrupt-driven, multi-tasking, multi-threading, and the like. As such, various actions, operations, and/or functions illustrated may be performed in the sequence illustrated, in parallel, or in some cases omitted. Likewise, the order of processing is not necessarily required to achieve the features and advantages of the examples described herein, but is provided for ease of illustration and description. One or more of the illustrated actions, operations and/or functions may be repeatedly performed depending on the particular strategy being used. One or more of the method steps described herein may be omitted if desired.

While various embodiments have been described above, it is to be understood that they have been presented by way of example, and not limitation. It will be apparent to persons skilled in the relevant arts that the disclosed subject matter may be embodied in other specific forms without departing from the spirit of the subject matter. The embodiments described above are therefore to be considered in all respects as illustrative, not restrictive. As such, the configurations and routines disclosed herein are exemplary in nature, and that these specific examples are not to be considered in a limiting sense, because numerous variations are possible. For example, the above technology can be applied to electric vehicles and hybrid vehicles including induction and synchronous electric machines. The subject matter of the present disclosure includes all novel and non-obvious combinations and sub-combinations of the various systems and configurations, and other features, functions, and/or properties disclosed herein.

The following claims particularly point out certain combinations and sub-combinations regarded as novel and non-obvious. These claims may refer to "an" element or "a first" element or the equivalent thereof. Such claims may be understood to include incorporation of one or more such elements, neither requiring nor excluding two or more such elements. Other combinations and sub-combinations of the disclosed features, functions, elements, and/or properties may be claimed through amendment of the present claims or through presentation of new claims in this or a related application. Such claims, whether broader, narrower, equal, or different in scope to the original claims, also are regarded as included within the subject matter of the present disclosure.

The invention claimed is:
1. A two-speed transmission, comprising:
a single electric machine;
a transmission case;

a single input shaft receiving input from the single electric machine; an intermediate shaft is connected to an output shaft without going through a differential;

a power take-off that is configured to bolt on to the transmission case and couple to the single input shaft via a gear, wherein the power take-off includes a hydraulically actuated clutch that is configured to selectively engage a power take-off shaft;

an actual total number of two gear ratios, the two gear ratios configured to couple the single input shaft to the output shaft; and a controller configured to prevent engagement of the hydraulically actuated clutch in response to the vehicle being propelled via the single electric machine.

2. The two-speed transmission of claim 1, wherein the clutch is directly coupled to a power take-off drive gear fixed to the power take-off shaft.

3. The two-speed transmission of claim 1, wherein the two-gear ratios are generated via a first gear, a second gear, a first clutch, and a second clutch, wherein the first gear, the second gear, the first clutch, and the second clutch are configured to selectively couple the single input shaft to the output shaft, the first gear selectively engaged via closing the first gear clutch and the second gear selectively engaged via closing the second gear clutch, the power take-off including a power take-off clutch coupled to the gear fixed to the input shaft.

4. The two-speed transmission of claim 1, wherein the power take-off shaft is configured to drive two different loads.

5. The two-speed transmission of claim 1, wherein the clutch is a dog clutch.

6. A method for operating a vehicle, comprising: driving an intermediate shaft to drive an output shaft without going through a differential; propelling the vehicle via a single electric machine coupled to a two-speed transmission; a power take-off bolted to a case of the two-speed transmission;

driving a mechanical load via the power take-off and the single electric machine when the vehicle is not being propelled via the single electric machine, wherein the power take-off includes a hydraulically actuated clutch that is configured to selectively engage a power take-off shaft; and preventing engagement of the hydraulically actuated clutch in response to the vehicle being propelled via the single electric machine.

7. The method of claim 6, further comprising operating the single electric machine in a speed control mode via a controller while driving the mechanical load.

8. The method of claim 6, further comprising operating with a first gear clutch and a second gear clutch of the two-speed transmission open in response to the hydraulically actuated clutch being engaged, thereby preventing the vehicle from being propelled via the single electric machine, a first gear of the two-speed transmission selectively engaged via closing the first gear clutch and a second gear of the two-speed transmission selectively engaged via closing the second gear clutch.

9. The method of claim 6, wherein an input shaft of the two-speed transmission includes a gear to drive the power take-off.

10. The method of claim 6, further comprising supplying oil to the power take-off via the case of the two-speed transmission.

11. A transmission system, comprising:

a single electric machine configured to propel a vehicle;

a transmission case;

an input shaft coupled to the single electric machine;

an intermediate shaft;

an output shaft;

a power take-off that is configured to bolt on to the transmission case and couple to the input shaft via a gear, the power take-off including a hydraulically actuated dog clutch; and a controller configured to operate the single electric machine in a torque control mode while the single electric machine is propelling the vehicle, the controller also configured to operate the single electric machine in a speed control mode while the single electric machine is driving a load via the power take-off.

12. The transmission system of claim 11, wherein the single electric machine is mechanically coupled to the input shaft and an inverter.

13. The transmission system of claim 11, wherein the transmission includes an actual total number of two gear ratios to propel the vehicle.

14. The transmission system of claim 11, wherein the hydraulically actuated dog clutch is supplied with oil that passes through the transmission case.

* * * * *